(12) United States Patent
Sherman

(10) Patent No.: US 7,268,724 B1
(45) Date of Patent: Sep. 11, 2007

(54) REDUCED-ERROR MONOPULSE PROCESSOR

(75) Inventor: Samuel Mark Sherman, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 06/334,832

(22) Filed: Dec. 23, 1981

(51) Int. Cl.
*G01S 13/44* (2006.01)

(52) U.S. Cl. .................. 342/149; 342/194; 342/152

(58) Field of Classification Search ............. 343/5 NQ, 343/16 M; 342/149–154, 80, 194
See application file for complete search history.

(56) References Cited

U.S. PATENT DOCUMENTS 3,378,843 A * 4/1968 Sherman ..................... 342/80
3,618,093 A * 11/1971 Dickey ....................... 342/149
3,696,416 A * 10/1972 Badiano et al. ............. 342/150
3,739,380 A * 6/1973 Burdic et al. ................. 342/65
3,810,175 A * 5/1974 Bell ............................ 342/183
3,943,508 A * 3/1976 Boucher et al. ............. 342/149
4,163,975 A * 8/1979 Guilhem et al. .............. 342/94
4,190,837 A * 2/1980 Salvaudon et al. ........... 342/17
4,220,953 A * 9/1980 Carre ........................... 342/94
4,345,252 A * 8/1982 Carre et al. ................... 342/91
4,843,398 A * 6/1989 Houston ....................... 342/74
5,402,130 A * 3/1995 Sherman ..................... 342/152

* cited by examiner

*Primary Examiner*—John B. Sotomayor
(74) *Attorney, Agent, or Firm*—Duane Morris, LLP

(57) ABSTRACT

This monopulse processor provides target position information having an RMS error which is less than that of a conventional monopulse processor. A $\Sigma\pm j\Delta$ vs. $\Sigma$ processor is modified to provide a position output signal equal to the smaller in absolute magnitude of the results obtained from the $\Sigma+j\Delta$ vs. $\Sigma$ and the $\Sigma-j\Delta$ vs. $\Sigma$ processing. A conventional monopulse processor is modified to provide an output signal having a value equal to $\text{Re}(\Delta/\Sigma)/[1+|\text{Im}(\Delta/\Sigma)|]$.

3 Claims, 2 Drawing Sheets

US 7,268,724 B1

REDUCED-ERROR MONOPULSE PROCESSOR

This invention relates to the field of signal processing and more particularly to monopulse signal processing.

During reception a conventional monopulse antenna generates a difference signal for each of its coordinates (elevation and traverse), and a sum signal. These signals are processed to determine the degree to which and the direction in which the target or source is off axis of the beam. The term target will be used hereinafter to refer both to targets which reflect a transmitted signal as in radar and to sources which radiate their own signals.

The Greek letters Σ (sigma) and Δ (delta) are often used to represent monopulse sum and difference signals, respectively. For simplicity, these signals will hereinafter be referred to with the symbols s and d, respectively.

In U.S. patent application, Ser. No. 268,051, filed May 28, 1981, entitled "IMPROVED MONOPULSE PROCESSOR", which is incorporated herein by reference, I described an improved s+jd processor, hereinafter referred to as an s+jd vs s processor, which achieves the same errors as conventional monopulse when used in an agile beam radar system. This enables s+jd processing to be performed with the same low error as with conventional monopulse radar, whereas without this improvement it gives a larger error.

Unfortunately, even conventional monopulse radar is subject to substantial errors in the presence of unresolved targets, jamming, interference and multipath signals. Improved processing techniques are needed which reduce these errors both in conventional monopulse processing and in s+jd vs s processing.

In accordance with a preferred embodiment of the present invention, the errors in conventional monopulse radar and s±jd vs s processing are reduced by providing as a target position signal in a given coordinate the value $Re(d/s)/[1+|Im(d/s)|]$, where d is the phasor difference signal in that coordinate and s is the phasor sum signal, $Re(d/s)$ is the real part of d/s and $Im(d/s)$ is the imaginary part of d/s. In conjunction with a conventional monopulse radar, this desired position signal value may be derived by operating on $Re(d/s)$ and $Im(d/s)$ which are available within the processor. In an s±jd vs s processor, this signal may be obtained by deriving the tangent of the phase angle between an s+jd signal and the s signal and the tangent of the phase angle between an s−jd signal and the s signal and providing the one with the smaller absolute magnitude as the position signal.

The invention will be described in connection with an improved s±jd vs s processor of the type described in my above mentioned patent application for an Improved Monopulse Processor. The symbols s and d as used herein represent phasors—that is, complex numbers that indicate the amplitude and phase of the respective signal.

Figure 1:
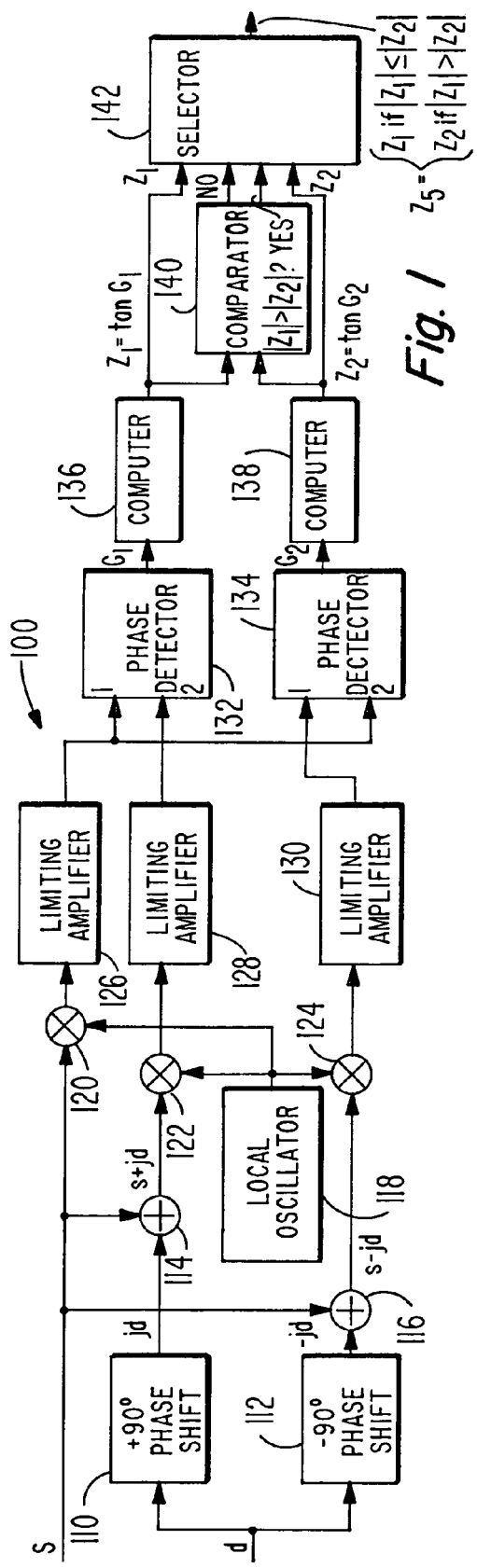

FIG. 1 illustrates in block diagram form a preferred signal processor 100 of the s±jd vs s variety modified in accordance with this invention.

Figure 2:
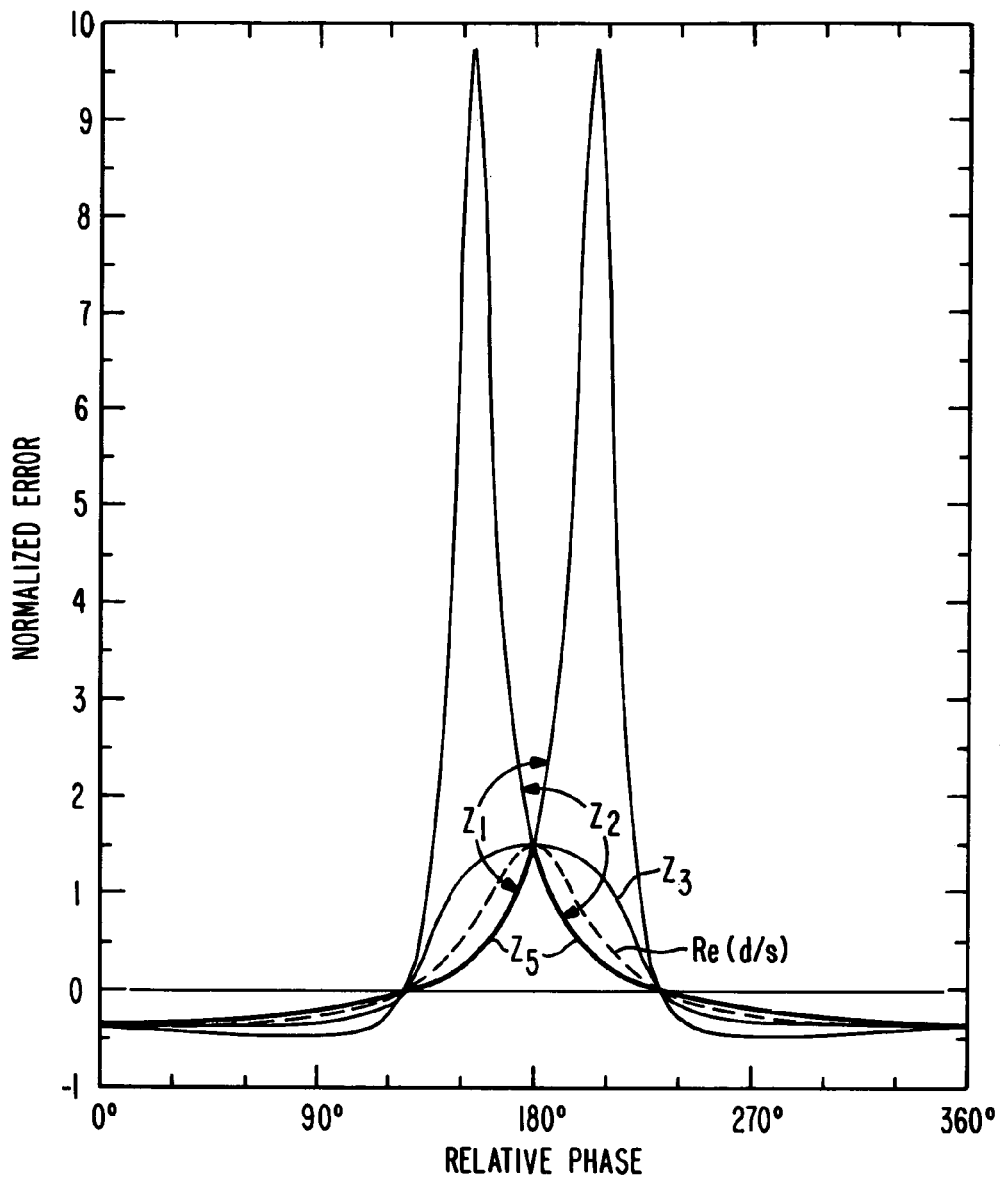

FIG. 2 graphs the normalized error for various processors processing the same signals.

Figure 3:
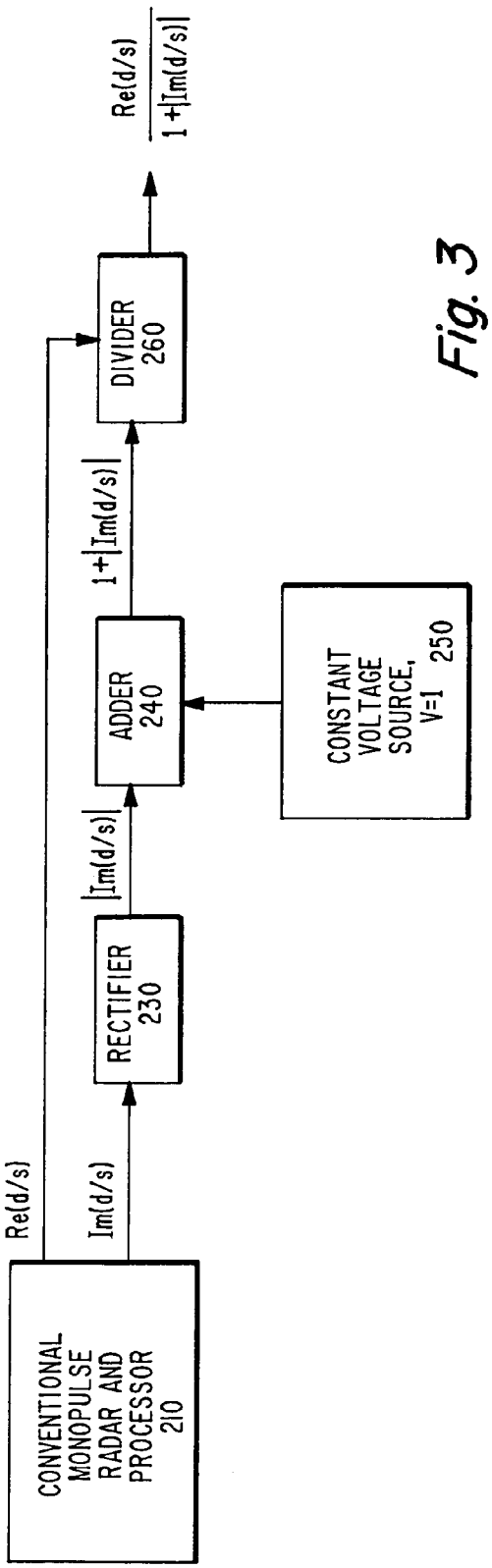

FIG. 3 illustrates in block diagram form a conventional monopulse processor modified in accordance with the invention.

A preferred monopulse processor 100 (for a given coordinate) in accordance with the present invention is illustrated in FIG. 1 in block diagram form. The other coordinate is processed simultaneously in this same way in a second similar system. This processor is useful with monopulse systems in general, and is particularly useful with monopulse radar. In this processor, the difference signal is fed to first and second phase shifters 110 and 112 which induce +90° and −90° phase shifts respectively, to form the signals jd and −jd. The outputs of the phase shifters are provided as first inputs to two combiners 114 and 116. The sum signal is provided as the second input of each of the combiners. The signal levels of the difference signals applied to the combiners are adjusted to have the same ratio to the received difference signal as the sum signals applied to the combiners have to the received sum signal in order to provide output signals proportional to s+jd and s−jd. The combiners 114 and 116 may be like those used in prior art systems. Each is preferably a microwave hybrid which, for example, sums its two input signals to produce its output signal. The outputs from the combiners 114 and 116 are signals equal to s+jd and s−jd, respectively.

A local oscillator 118 provides its output signal to three mixers, a "sum" mixer 120, an s+jd mixer 122 and an s−jd mixer 124. The other input to sum mixer 120 is connected to the sum terminal of the antenna. The output of the mixer 120 is fed to a "sum" amplitude limiting, phase retaining amplifier 126. The s+jd mixer 122 has its second input connected to receive the s+jd signal from combiner 114 and has its output connected to an s+jd amplitude limiting, phase retaining amplifier 128. The s−jd mixer 124 has its second input connected to receive the s−jd signal from combiner 116 and has its output connected to an s−jd amplitude limiting, phase retaining amplifier 130.

The output of the "sum" limiting amplifier 126 is provided as the first input to a phase detector 132 and as the second input to a phase detector 134. The output of the s+jd limiting amplifier 128 is provided as the second input to the first phase detector 132. The output of the s−jd limiting amplifier 130 is provided as the first input to the second phase detector 134. Phase detectors 132 and 134 may be like the phase detectors in prior art systems and produce output signals proportional to the phase angle between the signals applied thereto. The output of phase detector 132 is a signal representative of the phase angle $G_1$ of the s+jd signal relative to the s signal and is provided to a computer 136 which provides an output $Z_1$ equal to the tangent of $G_1$. The output of the phase detector 134 is a signal representative of the phase angle $G_2$ of the s signal relative to the s−jd signal and is provided to computer 138 which provides output $Z_2$ equal to the tangent of $G_2$.

The $Z_1$ and $Z_2$ signals are provided as inputs to a comparator 140 which determines which of the two signals $Z_1$ and $Z_2$ has the larger absolute magnitude. The $Z_1$ signal is provided as a first input to a selector 142 and the $Z_2$ signal is provided as a second input to the selector 142. The selector 142 receives the output of comparator 140 as a control signal and provides as its own output whichever of the two signals $Z_1$ or $Z_2$ has the smaller absolute magnitude. The selector 142 preferably receives the signals $Z_1$ and $Z_2$ in digital form and uses AND gates connected to receive the control signal from comparator 140 to control which signal is provided as its output. The same result, however, can be obtained by analog circuits if the signals $Z_1$ and $Z_2$ are in analog form.

FIG. 2 graphs the normalized error due to the presence of an undesired, unresolved additional target or due to multipath for each of the five processor types for an illustrative situation in which the sum signal contribution of the interfering target (or multipath) is 0.6 times the sum signal contribution of the desired target. The curve marked $Z_1$ is the error for a prior art s+jd versus s processor. The curve marked $Z_2$ is the error for an s−jd versus s prior art processor. The $Z_1$ and $Z_2$ curves have mirror symmetry about 180° with respect to each other. The curve marked $Z_3$ is the error for a prior art s+jd versus s−jd processor. The curve marked Re(d/s) is the curve for a conventional monopulse processor and for my improved s±jd vs s processor of my "IMPROVED MONOPULSE PROCESSOR" patent application. It will be observed that for relative phase angles less than 180°, the $Z_1$ curve has the minimum error among the four curves $Z_1$, $Z_2$, $Z_3$ and Re(d/s). Similarly, for phase angles between 180 degrees and 360 degrees the $Z_2$ curve has the smallest error among these four curves. In each case the smallest error is associated with the output specifying a target position closest to the beam axis. The portions of the $Z_1$ and $Z_2$ curves for which each has the minimum error are in bold face and marked $Z_5$. This cusp-like $Z_5$ curve is the error of the processor in FIG. 1 which consequently has the smallest overall error among the processors whose errors are graphed in FIG. 2.

A conventional monopulse processor can be modified to provide this same reduced error. It is shown in my patent application on the IMPROVED MONOPULSE PROCESSOR in equation 6 that $Z_1$ equals Re(d/s)/[1−Im(d/s)] and in equation 9 that $Z_2$ equals Re(d/s)/[1+Im(d/s)]. Selecting the one of $Z_1$ and $Z_2$ which has the smaller absolute value is equivalent to selecting the one whose demonimator has the larger absolute value. Thus, the selected output $Z_5$ is equal to Re(d/s)/[1+|Im(d/s)|], where |Im(d/s)| is the absolute magnitude of Im(d/s). Depending on the particular design and circumstances of the radar system and its use, a still greater improvement in error may be obtainable by providing an output equal to Re(d/s)/[1+a|Im(d/s)|$^b$], in which the constants a and b are selected to minimize errors for that particular radar and application. The normal out-put of a conventional monopulse processor is equal to Re(d/s). In addition, a conventional monopulse processor can provide an output equal to Im(d/s). See, for example, my U.S. Pat. No. 3,378,843 in which x was used to represent Re(d/s) and y was used to represent Im(d/s). That patent is incorporated herein by reference. A conventional monopulse radar producing outputs Re(d/s) and Im(d/s) can be modified to produce an output equivalent to $Z_5$. One analog circuit embodiment of such a modification is illustrated in FIG. 3. The Im(d/s) output signal of a conventional monopulse radar is a bipolar voltage—that is, a varying voltage that can be either positive or negative. This output signal is full-wave rectified by a full-wave rectifier 230 which can take any one of several well-known analog forms, such as a diode network. This rectifier converts the Im(d/s) signal at its input to an output voltage |Im(d/s)|, which is the absolute value of Im(d/s) and has the same magnitude as Im(d/s) but is always positive. This signal is provided as one input to an analog adder 240. Adder 240 can take any of several well-known analog forms, such as a resistive network or an operational amplifier. The other input to adder 240 is a constant d.c. voltage obtained from a voltage source 250, which includes a potentiometer or some other control mechanism to adjust its output voltage to a value of 1 unit. In general the unit is not 1 volt, but is defined as the value of |Im(d/s)| when d and s are equal in magnitude and 90° apart in phase. The correct setting of the constant voltage can be determined by injecting a pair of test signals, having the same amplitude but 90° relative phase, into the RF or IF portion of the radar. One test signal is injected into the sum channel and the other into the difference channel. The resulting voltage appearing at the output of rectifier 230 is defined as one voltage unit, and the voltage out of source 250 is then adjusted to that same value. The output voltage from adder 240 is a voltage equal to 1+|Im(d/s)| units.

An analog divider 260 is connected to receive the signal 1+|Im(d/s)| as its divisor input and the signal Re(d/s) as its dividend input and provides a quotient signal having a value Re(d/s)/[1+|Im(d/s)|] which becomes the target position designating signal in that coordinate. Divider 260 can take any one of various analog forms. For example: (1) analog operational amplifiers designed to output the ratio of two input voltages are available; (2) the divider may contain two logarithmic amplifiers or networks and a differencing circuit, producing the logarithm of the ratio, which can be converted to the ratio itself either by calibration or by an amplifier or network having an anti-logarithmic characteristic; (3) the divider may include amplifiers for its two inputs with automatic gain control derived from the 1+|Im(d/s)| channel but controlling the gain of the Re(d/s) channel.

If desired, the operations performed by rectifier 230, adder 240, constant-voltage source 250, and divider 260 can be represented as arithmetic operations and performed by digital computing devices operating on digital versions of the Re(d/s) and Im(d/s) signals obtained by analog-to-digital conversion of those signals.

What is claimed is:

1. In a radar system of the type which derives a phasor sum signal s and a phasor difference signal d in one coordinate and which provides a first signal representative of the tangent of the phase angle between the signal s+jd and said s signal and a second signal representative of the tangent of the phase angle between, said s signal and the signal s−jd, the improvement comprising:
   means for comparing said first signal and said second signal to determine which has the smaller absolute magnitude; and
   means responsive to said comparator means for providing as the position-designating output signal of said system the one of said first signal and said second signal which has the smaller absolute magnitude.

2. In a radar system of the type which derives a phasor sum signal s and a phasor difference signal d in one coordinate and provides a first signal having a value equal to the real part of d/s and a second signal having a value equal to the imaginary part of d/s, the improvement comprising:
   means for rectifying said second signal;
   means for supplying a positive, d.c. reference voltage;
   means for adding said reference voltage to said rectified second signal to produce a third signal; and
   means for dividing said first signal by said third signal to produce a target position-designating signal for said one coordinate.

3. In a radar system of the type which derives a phasor sum signal s and a phasor difference signal d in one coordinate and provides a first signal having a value equal to the real part of d/s (symbolized by Re(d/s)) and a second signal having a value equal to the imaginary part of d/s (symbolized by Im(d/s)), the improvement comprising:
   means for determining the absolute value of the imaginary part of d/s (symbolized as |Im(d/s)|);
   means for adding one to the absolute value of |Im(d/s)|; and
   means for dividing Re(d/s) by [1+|Im(d/s)|] to provide a signal having the value Re(d/s)/[1+|Im(d/s)|] as the target position designating signal for that coordinate.

* * * * *